(12) United States Patent
Krawczewicz et al.

(10) Patent No.: US 9,033,247 B2
(45) Date of Patent: May 19, 2015

(54) BATTERYLESS RE-USABLE SELF-BOARDING PASS

(76) Inventors: Mark Stanley Krawczewicz, Annapolis, MD (US); Kenneth Hugh Rose, Annapolis, MD (US); Jay Steinmetz, Balt, MD (US)

( * ) Notice: Subject to any disclaimer, the term of this patent is extended or adjusted under 35 U.S.C. 154(b) by 0 days.

(21) Appl. No.: 13/336,104

(22) Filed: Dec. 23, 2011

(65) Prior Publication Data

US 2012/0217303 A1    Aug. 30, 2012

Related U.S. Application Data

(60) Provisional application No. 61/426,732, filed on Dec. 23, 2010.

(51) Int. Cl.
| | | |
|---|---|---|
| G06K 19/06 | (2006.01) | |
| G06Q 30/02 | (2012.01) | |
| G06Q 50/30 | (2012.01) | |
| G07C 9/00 | (2006.01) | |

(52) U.S. Cl.
CPC ............ *G06Q 30/0207* (2013.01); *G06Q 50/30* (2013.01); *G07C 9/00111* (2013.01)

(58) Field of Classification Search
USPC .................................. 235/380, 487, 488, 492
See application file for complete search history.

(56) References Cited

U.S. PATENT DOCUMENTS

| | | | |
|---|---|---|---|
| 6,476,718 B1 | 11/2002 | Cartwright et al. | |
| 6,609,659 B2* | 8/2003 | Sehr | 235/384 |
| 6,910,628 B1* | 6/2005 | Sehr | 235/384 |
| 6,926,203 B1* | 8/2005 | Sehr | 235/492 |
| 7,270,276 B2* | 9/2007 | Vayssiere | 235/492 |
| 7,584,896 B2 | 9/2009 | Warther et al. | |
| 7,845,569 B1* | 12/2010 | Warther et al. | 235/492 |
| 7,946,501 B2* | 5/2011 | Borracci | 235/492 |
| 2002/0084904 A1* | 7/2002 | De La Huerga | 340/573.1 |
| 2002/0100803 A1* | 8/2002 | Sehr | 235/384 |
| 2003/0128099 A1* | 7/2003 | Cockerham | 340/5.7 |
| 2003/0214407 A1* | 11/2003 | Sweatte | 340/573.1 |
| 2004/0005914 A1* | 1/2004 | Dear | 455/563 |
| 2005/0258229 A1 | 11/2005 | Minemura | |
| 2006/0161789 A1* | 7/2006 | Doughty et al. | 713/186 |
| 2008/0096326 A1* | 4/2008 | Reed | 438/126 |
| 2008/0282540 A1* | 11/2008 | Singleton | 29/856 |
| 2009/0134223 A1 | 5/2009 | Matthews et al. | |
| 2009/0152364 A1 | 6/2009 | Spivey, Jr. | |
| 2009/0199004 A1* | 8/2009 | Krawczewicz et al. | 713/172 |
| 2009/0206994 A1 | 8/2009 | Lee | |
| 2009/0218395 A1 | 9/2009 | Chien et al. | |
| 2009/0254438 A1 | 10/2009 | Johnson, Jr. et al. | |
| 2009/0289762 A1 | 11/2009 | Tassy et al. | |

(Continued)

FOREIGN PATENT DOCUMENTS

WO    WO 00/36560    6/2000

*Primary Examiner* — Paultep Savusdiphol
(74) *Attorney, Agent, or Firm* — 24IP Law Group; Timothy R DeWitt

(57) ABSTRACT

A self-boarding pass having a batteryless thin flexible display inlay and a housing encapsulating the batteryless thin flexible display inlay. The batteryless thin flexible display inlay has a bi-state display, display control circuitry, a secure processor and an antenna. The housing has a composite layer having front and back faces and a window aligned with the display in the batteryless thin flexible display inlay, printing on the front face of the composite later and a transparent polyester plastic layer encapsulating the composite layer, the printing and the window.

14 Claims, 4 Drawing Sheets

(56) References Cited

U.S. PATENT DOCUMENTS

| | | |
|---|---|---|
| 2009/0295749 A1 | 12/2009 | Sato et al. |
| 2009/0309736 A1* | 12/2009 | Heurtier .................... 340/572.8 |
| 2009/0321516 A1 | 12/2009 | Yang |
| 2010/0019905 A1 | 1/2010 | Boddie et al. |
| 2010/0033307 A1 | 2/2010 | Narendra et al. |
| 2010/0033310 A1 | 2/2010 | Narendra et al. |
| 2010/0039265 A1 | 2/2010 | Spivey, Jr. |
| 2010/0052908 A1 | 3/2010 | Doan et al. |
| 2010/0066497 A1 | 3/2010 | Lim et al. |
| 2010/0070312 A1* | 3/2010 | Hunt ................................ 705/5 |
| 2010/0079416 A1 | 4/2010 | Chung et al. |
| 2010/0117800 A1 | 5/2010 | Li et al. |

* cited by examiner

BATTERYLESS RE-USABLE SELF-BOARDING PASS

CROSS-REFERENCE TO RELATED APPLICATIONS

The present application claims the benefit of the filing date of U.S. Provisional Patent Application Ser. No. 61/426,732 filed by Mark Stanley Krawczewicz and Jay Steinmetz on Dec. 23, 2010.

The aforementioned provisional patent application is hereby incorporated by reference in its entirety.

STATEMENT REGARDING FEDERALLY SPONSORED RESEARCH OR DEVELOPMENT

None.

BACKGROUND OF THE INVENTION

1. Field of the Invention

The present invention relates to boarding passes and, more particularly, to re-usable boarding passes for airlines and the like.

2. Brief Description of the Related Art

Boarding passengers quickly and more securely that is more than just added convenience to the flyer. The initial statistical metrics from the self check-in boarding pilot programs around the world have shown to decrease the boarding times up to 3×—saving the airline industry money.

International Air Transport Association (IATA) and other airline advocates have embraced and promoted advancements in boarding technology from 1D barcodes and magnetic strip technology to 2D barcodes and RFID technology for boarding. The new infrastructure hardware for gate boarding and airport kiosks for generating boarding passes is costly. In addition, this hardware must be capable of handling several types of boarding passes both mobile electronic and paper based generated boarding passes.

The key shortfall with employing 2D barcodes and RFID is security. The additional authenticating method to checking a user's ID or passport should be machine based and very secure. Reading barcodes and or a unique ID to a reader is machine based but it a one-way communications link (from card to reader). Strong cryptographic systems are two-way and require a share a single or shared split cryptographic key to protect the user's data.

Updating user's data like flight, seat, and boarding order are dynamic and require cryptographic keys to robustly protect. Static user data like name and data of birth require encryption and should only leave the users card after the reader has proven their identity cryptographically using mutual challenge response algorithm.

Any proposed future system must not require any significant hardware costs to what is already in place and must provide enhanced efficiency, security, and convenience. Although these 3 check-in processes are dynamic and implementing emerging technologies, no one boarding method (home internet, mobile, or kiosk) can be used alone and get 100% customer acceptance. All provide more efficient boarding yet all three fall short of a comprehensive solution for reasons such as not all cell phones batteries die and some are not web enabled, travelers may not have time at home or at the office to print boarding passes and kiosks run out of paper & ink.

A variety of systems and methods for secure authentication using a token have been used in the past. Such smart tokens may be in the form of smartcards, USB tokens or other forms. Conventional smartcards typically are credit-card sized and made out of flexible plastic such as polyvinyl chloride. Smartcards have been used in wide varieties of applications, such as identification badges, membership cards, credit cards, etc. Conventional USB token are typically small and portable and may be of any shape. They are embedded with a micromodule containing a silicon integrated circuit with a memory and a microprocessor.

Smartcards can be either "contact" or "contactless." Contact cards typically have a visible set of gold contact pads for insertion into a card reader. Contactless cards use radio frequency signals to operate. Other smart tokens connect to other devices through a USB or other communications port.

Smart cards typically may have information or artwork printed on one or both sides of the card. Since smart cards are typically credit card sized, the amount of information that may be displayed on a smartcard is typically limited. A number of efforts have been made to increase the amount of data that may be displayed on a smartcard. For example, U.S. Pat. No. 7,270,276 discloses a multi-application smartcard having a dynamic display portion made, for example, of electronic ink. The display on that card changes from a first display to a second display in response to an application use of the smartcard. Another example is U.S. Patent Publication Serial No. US2005/0258229, which disclosed a multi-function smartcard (also known as an "integrated circuit card" or "IC card") with the ability to display images on the obverse side of the card.

Access control stations typically located on the boundary of the security area or building use some method to verify or authenticate the uses who are allowed access. The general methods to authenticate include one or more of the following;
What you have—a card or ID machine or visually checked by a guard
What you know—a password typed into a keypad
What you are—a physical biometric attribute comparing a pre-stored "template" to a live scan using some hardware at the access control station There are many shortfalls and added system complexities for implementing these access control methods like; user data must be stored on a database or within the card securely, cards can be duplicated or lost, passwords can be hacked, biometrics are difficult and costly to store and scale to larger access control networks.

Recently, efforts have been made to incorporate displays into RFID cards and tags. For example, in U.S. Patent App. Pub. No. 2010/0052908 entitled "Transient State Information Display in an RFID Tag," a display is incorporated into an RFID card to show a transient state such as an age of a product. In the preferred embodiment disclosed in that patent, a card or tag reader provides a current date while the card provides the expiration date of the product. Based on a comparison of those two, an LED is illuminated to reflect the status of the product. The disclosure indicates that a variety of other types of displays may be used and also that the card may be active or passive. In another example, U.S. Patent App. Pub. No. 2010/0079416 entitled "Radio Frequency Identification (RFID), Display Pixel, and Display Panel and Display Apparatus Using RFID Display Pixel" discloses an RFID tag connected to an "RFID pixel" or plurality of "RFID pixels." Another example is described in U.S. Patent App. Pub. No. 2009/0309736 entitled "Multifunction Contactless Electronic Tag for Goods."

SUMMARY OF THE INVENTION

In a preferred embodiment, the present invention in a batteryless self-boarding pass, card or badge. The boarding pass comprises a batteryless thin flexible display inlay and a housing encapsulating the display inlay. The display comprises a bi-state display, display control circuitry, a secure processor, a memory and an antenna. The housing encapsulates the display inlay and comprises a composite layer having front and back faces and a window aligned with the display in display inlay, printing on said front face of said composite later and a transparent polyester plastic layer encapsulating said composite layer, said printing and said window.

Yet another feature of the proposed invention is the ability to securely store by cryptographic means, the cardholders biographical and biometric information, as well as dynamically changing flight data, seating, boarding priority and reward points earned.

Another security feature of the invention is a bi-directional two-way authentication process, meaning that the card and firewall hardware have the ability to first verify they are trusted devices respectively, prior to any information is decrypted and shared. This mutual Challenge Response authentication prevents the "leakage" of user data from a rogue reader. The display on the card is trusted and will show status of the mutual authentication process.

Yet another feature of the invention is the card can verify the user to the reader using a 2 or 3 factor authentication process. The second factor is the password. The third factor (biometric) is optional but would maximize the assurance level connecting the card to the user.

Another security feature of the invention for remote login is the display on the card will show status and results of each one of these authentication processes. Authentication can then allow for dynamic changes to the users level of access depending on threat level of the overall network, availability of biometric sensor, users location or privileges.

Another security feature of the invention for remote login is the integrated processor securely stores user's data like; digital photo, biometric templates, role, and privileges and vastly simplifies network database requirements. This data would be decrypted from the card only after a successful user authentication.

Yet another feature of this invention is an independent audit log file of the secure session can be displayed and carried on the user's token for later verification.

Other aspects of the this invention include the integration of the bi-state display to the security processor. Once a connection has been established between the self-boarding pass and a reader, the Self-Boarding pass allows a visual review using the secure display portion of the card of the credential or authorization privileges of the user. Since the self-boarding pass display shows protected portions of the card memory, the memory contents are provably secure and a secure link has been established between the self-boarding pass and the reader.

Other aspects of this invention include protection of the keys used for data transmission and securing the users data within the memory of the card. Encryption uses keys to encrypt this data however, this key has to be stored somewhere and the term, "Data-at-rest" encompasses the complete security architecture implemented to secure the key or keys including how the authentication, tamper, and key split algorithms are used in concert.

The composite layer may comprise Teslin. The printing may comprise a black and white or color photograph, a name, a frequent flyer number and a bar code. The bi-state display may comprises a plurality of display lines or comprise a plurality of bi-state displays. The window in the housing may be aligned with a first line of the plurality of display lines and a second window may be aligned with a second of said plurality of display lines. The boarding pass may include any arrangement of windows and lines to accommodate the data to be displayed in a particular embodiment.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

Figure 1A:
FIGS. 1A and 1B are illustrations of the front and back faces of a secure re-usable batteryless self-boarding pass in accordance with a preferred embodiment of the present invention.

The re-usable boarding pass technology of the present invention is easily compatible with home Internet, mobile, or airport kiosk and is truly paperless. Each side of the card has a specific function. The front side of the card 100, shown in FIG. 1A, has the customer's pre-printed biographical data like photo 110, name 120, frequent flyer number 130 along with a 2D barcode 140 that encodes the same information. This data does not change. Using the existing gate access turnstile hardware, the customer scans the 2D barcode 140 to enter the jet bridge. Airline branding and customer loyalty is reinforced by actively storing the user earned miles within the memory chip embedded in the card. The customer can more easily gain access to the total of these miles using any NFC enable device. Seating upgrades and comps can easily be added to card securely and conveniently through the contactless NFC card interface.

Figure 1B:
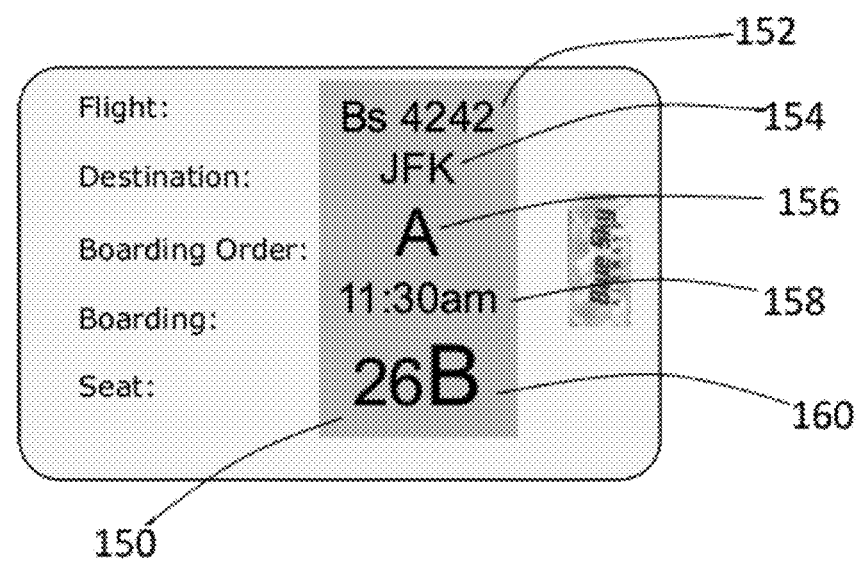

The obverse or back side of the card, shown in FIG. 1B, contains the dynamic bi-state display 150. This information is updated for each flight through an NFC interface. Once update, the display keeps in that state conveniently displaying all the information the customer needs to quickly find their seat. Since all power is harvested from the readers to update the display data, the card will last for years of service. The displayed information may include, for example, a flight number 152, destination 154, boarding order 156, boarding time 158 and seat number 160. Printed information identifying the various lines of the display may be included as well.

Figure 2:
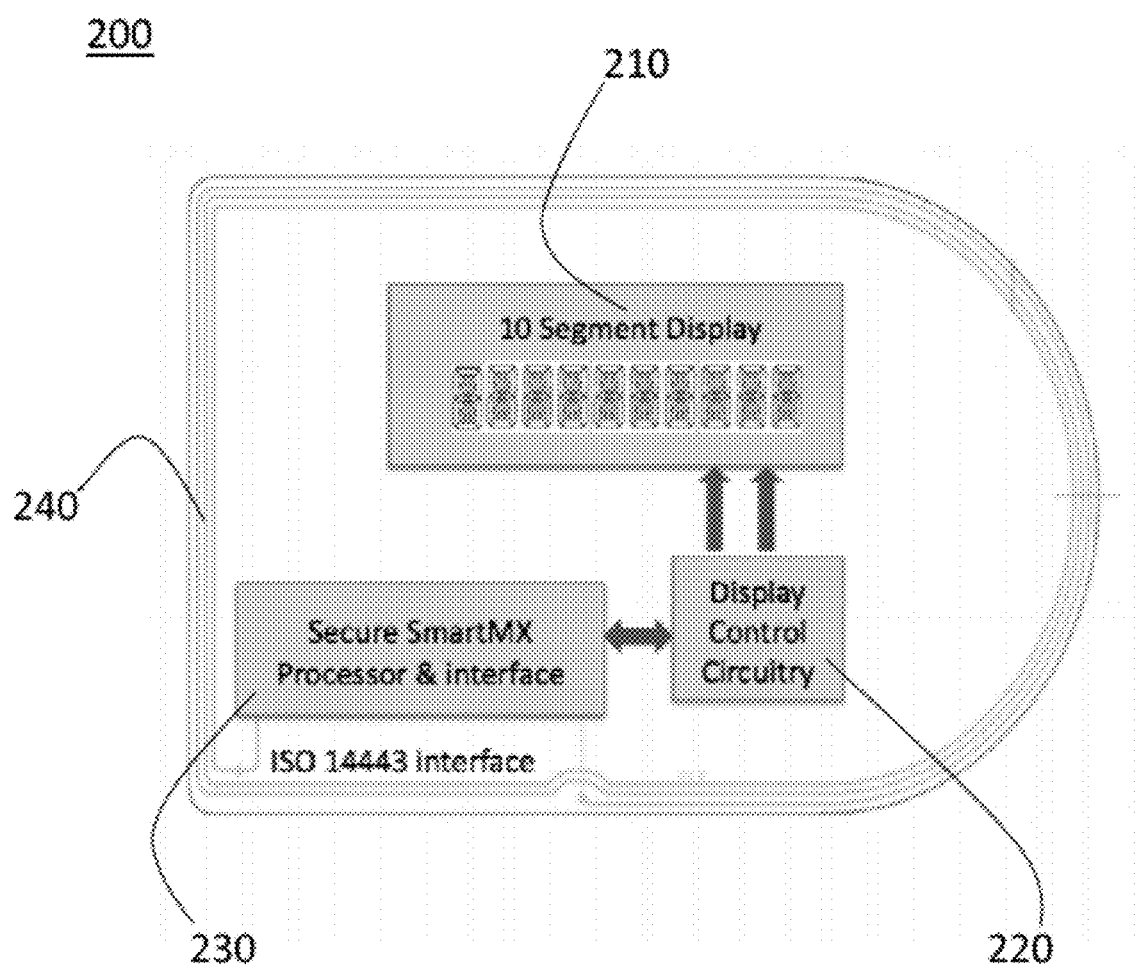
FIG. 2 is a schematic diagram of a secure re-usable batteryless self-boarding pass in accordance with a preferred embodiment of the present invention.

A thin flexible display assembly 200 has circuitry comprised of the functional components in FIG. 2. A bi-state display 210 is changed and update from power & data from the merchants RFID reader payment terminal. The display 210 will stay in the state it was written to until power and data are applied during the next payment or reward redemption transaction. Internal circuitry includes a secure processor 230 that interfaces with inlay antenna 240 and the special drive circuitry 220 for switching the bi-state display. The configuration of inlay components does not require an internal battery allowing the display assembly to operate for years. The near field communication (NFC) antenna 240 couples power and data electromagnetically from the coil of the reader. Based upon a modulation frequency of 13.45 MHz and using a standard baseband protocol defined as ISO 14443, a preferred embodiment of the invention was designed to work entirely through existing NFC RFID hardware. Internal chip memory encrypts and protects biometrics, user photo or biographical data, flight information, etc.

In the self-boarding pass of the present invention, as shown in FIGS. 1A and 1B, the display circuitry or assembly 200 is fully encapsulated in a housing formed of a composite layer of Teslin™, and then a polyester plastic. The outer surface of the Teslin is printed using a digital, reverse dye sublimation, heat transfer, or any traditional ink process to create the graphics or print on the Teslin. The area were the display 150 is located is cut out in the Teslin. The cutout may be large enough to include all of the lines of the display or there may be a separate cutout for each line of the display. The inlay 200 is attached from the inside and aligned with the cut-out window. The Teslin layer provides excellent thermal barrier from excessive hot & cold temperatures.

The polyester layer serves two functions. First, it provides a transparent or clear protective window on top of the display panel area 250. Second, it acts a general protective barrier for the circuit display inlay from water and chemicals. The inlay display circuitry shown in FIG. 2 may be modified to facilitate multi-line display as shown in FIG. 1B to align with the separate boarding data.

As discussed above, the thin flexible display module can be encapsulated in protective plastic laminate to form a badge or ID credential. This new class of smart ID credential has a distinctive dynamic display feature provides particular benefits that enhance aviation security. These cards have advantages to other smart card credentials because they are:

Visually dynamic—the programmable bi-state can display day/hour/minute, verify a pilot in the cockpit, an airport employee, a Government official, a returning vet, or a pre-vetted passenger, for example.

Secure—performs as both an ID credential and secure "container" for personal information like boarding pass information, biometrics, name, birthday, or other flyer data.

Maintains both electronic and visual chain of trust—card can be verified at a kiosk or access control point, and then confirmed visually at a later time.

The display is "bi-state" meaning that once it's been changed it maintains that state until it is updated again. This new class of ID cards provides "visual evidence & feedback" that can be used effectively to enhance security in many applications.

Only trusted kiosk can write or change display contents (single line or slide show) memory.

Internal chip memory—encrypts and protects user flight data and/or biographical data, and card holder loyalty information.

The present invention places more capability, trust, security, and computation in the card that conventional systems. One output of the present invention is writing the result of the access control process to a display located within the card. The output indicates a timestamp, user role, or date the access control event occurred making it a dynamic credential.

Storing the data in the card and having on-card display increase the effectiveness and simplifies the authentication network. In addition, mobile access stations do not require secure connectivity back to a central database that stores each user's data.

Integrating a dynamic display on the self-boarding pass allows cardholders to, for example, authenticate at one location maybe not at the perimeter of the secure facility. The checking agent could simply visually check the card holder's display proving they recently validated at an access control station. The display would show the hours, days, weeks or months the cardholder's card was valid. The dynamic secure display technology embedded into the card provides a chain of trust to the authentication process. This invention bridges the security air gap between checkpoints, to maintain chain of trust.

The comprehensive solution requires a more capable credential that can securely store the user's biometric and other data, and visually prove at a later time that a secure authentication process at the access control terminal has successfully been performed.

The display is written via the RFID interface from the access terminal reader. The access terminal is assumed secure and trusted therefore all display information is done through the payment software. Audible tones to mark completion of the process, is done by the payment terminal.

The display may be a segmented electrophoretic display (E ink), which does not require any power to keep its visible information. The display, for example, contains 10 digits alpha-numerics. The software at the secure controller can drive the display through a supplied SW library.

Figure 3A:
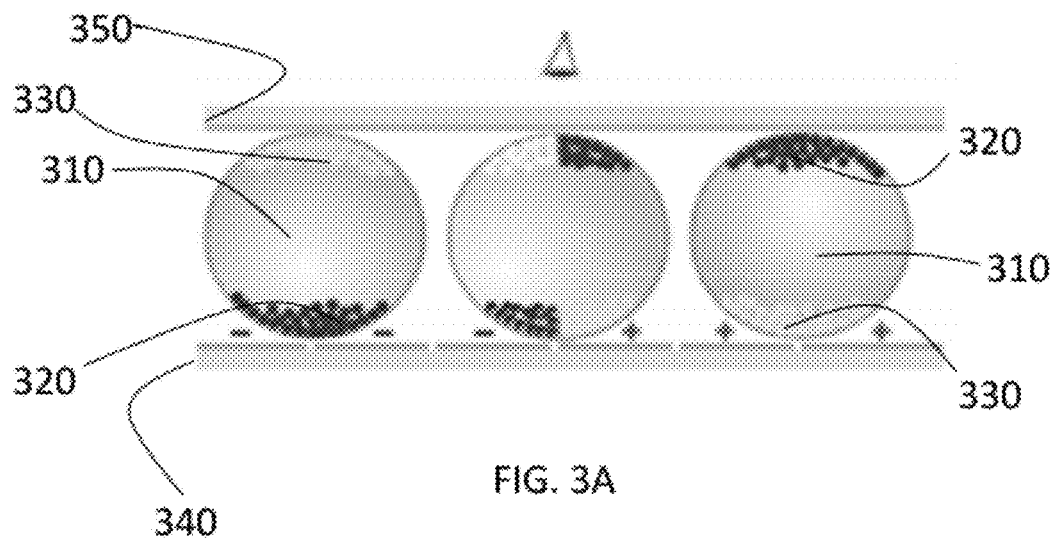
FIG. 3A is a cross sectional view of an E-ink bi-state display in accordance with a preferred embodiment of the present invention.

The display in a preferred embodiment is a bi-state display that does not require power to maintain the display after each use. Rather, the display is changed at the time of check-in. Further, the luggage tags in a preferred embodiment of the present invention may be designed to be interoperable with existing contactless RFID readers and infrastructure. As shown in FIG. 3A, the display 310 may be, for example, an electrophoretic layer or assembly comprised of a back plane 340, a top plane 350, and an electrophoretic material 310 positioned in between the two. In a preferred embodiment, the bottom plane 340 is an electrical circuit layer and the top plane 350 is a transparent conductive plastic layer.

The display is a segmented electrophoretic display (E ink), which does not require any power to keep its visible information. The display contains 10 digits alpha-numerics and two decimal points. The software at the secure controller can drive the display through a supplied SW library.

In a preferred embodiment, the display is an E-Ink bistable display based on electrostatic charges used to affect tiny spheres suspended in a plane, which is described with reference to FIG. 3A. The spheres 310 are electrostatically charged with a black half 320 carrying the negative charge and a white half 330 carrying the positive charge. Two electrodes surround the plane; the front one transparent. When a charge is placed across the electrodes the spheres rotate to align with the front-to-back charge gradient. Because the spheres are suspended in a semi-solid when the power is removed, they remain in that position and the display continues to show whatever design or text it showed before power was removed.

Figure 3B:
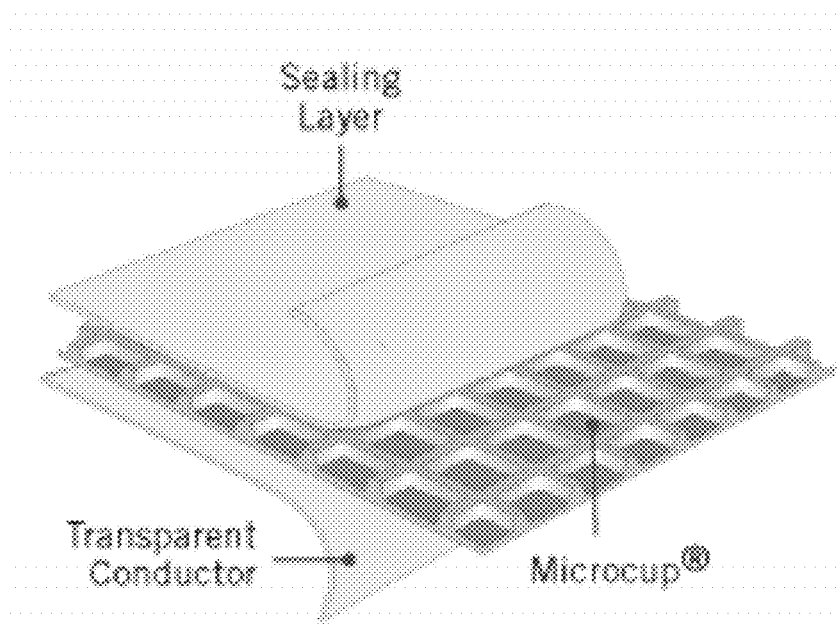
FIG. 3B is a cross sectional view of an electrophoretic bi-state display in accordance with a preferred embodiment of the present invention.

In another embodiment, an SiPix display is used. The SiPix display, shown in FIG. 3B, is a variant of a plastic Electrophoretic display that is thin and flexible and uses a microcup structure to hold electronic ink stable. SiPix's microcup technology involves a microscale container which holds minute quantities of fluid and particles.

The display structure, typically 150 μm thin, is built upon a flexible PET plastic substrate, which may include a transparent conductor such as Indium Tin Oxide (ITO). The contents of the microcup are hermitically sealed to protect them from the environment. Similar electrodes on both either side change position and orientation of material suspending in a gel like fluid. SiPix is also an Electrophoretic a reflective display that uses electrophoresis to switch pixels or segments on and off. Electrophoresis is the motion of charged particles suspended in a liquid in response to an electric field. If the white particles migrate to the visible surface, the display exhibits the color white.

Figure 3C:
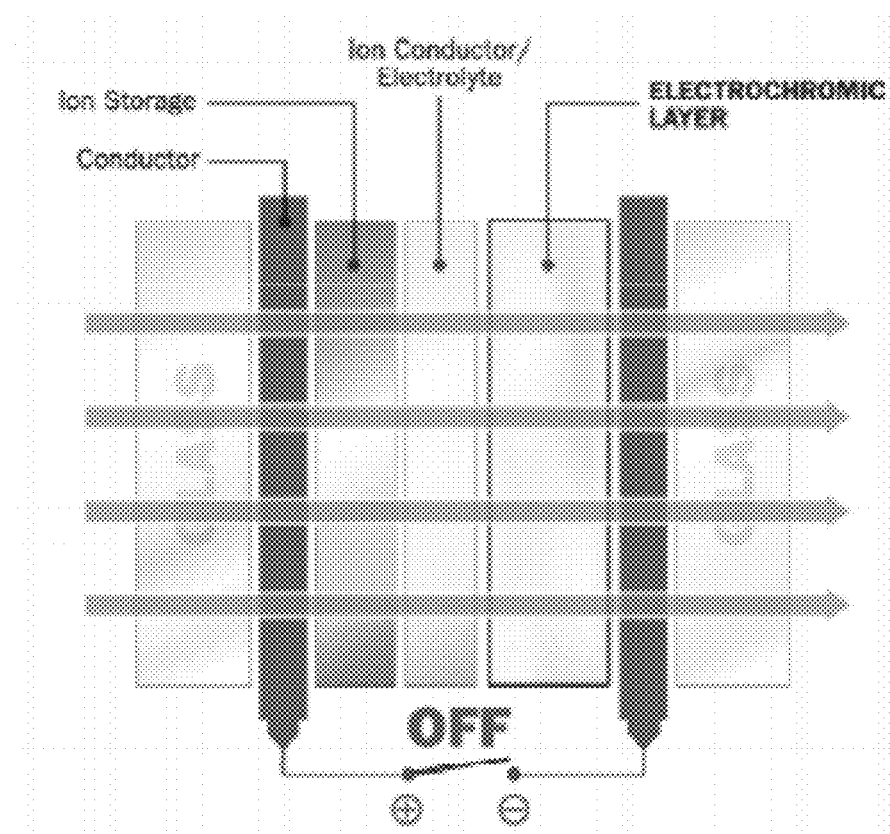
FIG. 3C is a cross sectional view of an electrochromatic bi-state display in accordance with a preferred embodiment of the present invention.

In yet another embodiment, the bi-state display is a spiral crystal LCD technology that reflects almost all the image light cast on it while attenuating most of the ambient light to produce a bright reflected display. Cholesteric materials are a liquid crystal that is a type of liquid crystal with a helical (smooth curve like a spiral) structure. Cholesteric liquid crystals are also known as chiral nematic liquid crystals have molecules that maintain their orientation. Some substances exist in an odd state that is similar to both liquid and solid. When they are in this state, the molecules tend to maintain their orientation, like solids, but can also move like a liquid. Liquid crystals are such materials. However, in essence they are more like a liquid and require only a little heat to move from this odd state to a liquid state. A feature of liquid crystals is that they are affected by electric currents. Depending on the temperature and particular nature of a substance, liquid crystals can be in one of several distinct phases, including nematic phase and the cholesteric phase. LCDs use these types of crystals because they react predictably to electric current in such a way as to control light passage In still another embodiment, an electrochromic display is used. The display is comprised of a layer of electrochromic material sandwiched between two electrode layers, as shown in FIG. 3C. The material changes from one color to another when stimulated by an electric current. The top electrode layer is made from transparent plastic, so the display can be seen clearly through it.

The chemical reaction at work is an oxidation reaction—a reaction in which molecules in a compound lose an electron. Ions in the sandwiched electrochromic layer are what allow it to change from opaque to transparent. It's these ions that allow it to absorb light. A power source is wired to the two conducting oxide layers, and a voltage drives the ions from the ion storage layer, through the ion conducting layer and into the electrochromic layer. This makes the glass opaque. By shutting off the voltage, the ions are driven out of the electrochromic layers and into the ion storage layer. When the ions leave the electrochromic layer, the window regains its transparency.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A batteryless self-boarding pass comprising:
   a batteryless thin flexible display inlay comprising:
   a bi-state display;
   display control circuitry;
   a secure processor;
   a memory; and
   an antenna;
   wherein said bi-state display is powered solely through power received through said antenna from a reader and wherein said bi-state display displays a plurality characters conveying information received from said reader through said antenna, said characters being numbers or letters;
   a housing encapsulating said batteryless thin flexible display inlay, said housing comprising:
   a composite layer having front and back faces and a window in said front face aligned with said bi-state display in said batteryless thin flexible display inlay;
   printing on said front face of said composite later; and
   a transparent polyester plastic layer encapsulating said composite layer, said printing and said window;
   wherein no battery is encapsulated in said housing.

2. A batteryless self-boarding pass according to claim 1 wherein said composite layer comprises Teslin.

3. A batteryless self-boarding pass according to claim 1 wherein said printing comprises a color photograph.

4. A batteryless self-boarding pass according to claim 1 wherein said bi-state display comprises a plurality of display lines.

5. A batteryless self-boarding pass according to claim 4 wherein said window is aligned with a first line of said plurality of display lines and a second window is aligned with a second of said plurality of display lines.

6. A batteryless self-boarding pass according to claim 4 further comprising:
   means for storing flight data in said memory;
   means for displaying said flight data on said bi-state display;
   means for dynamically changing said flight data stored in said memory; and
   means for displaying said changed flight data on said bi-state display.

7. A batteryless self-boarding pass according to claim 6 wherein said flight data comprises seating, boarding priority and reward points earned and said batteryless self-boarding pass further comprises means for dynamically changing at least one of seating, boarding priority and reward points earned.

8. A batteryless self-boarding pass according to claim 1 further comprising cryptographic means within said housing for securely storing a user's biometric information.

9. A batteryless self-boarding pass according to claim 1 further comprising means for performing a bi-directional authentication process with a card reader to verify that said self-boarding pass and said reader are trusted devices.

10. A batteryless self-boarding pass according to claim 9 further comprising means for changing said display to show a status of said bi-directional authentication process.

11. A batteryless self-boarding pass according to claim 1 further comprising means for verifying a user of said self-boarding pass using a multi-factor authentication process.

12. A batteryless self-boarding pass according to claim 11 wherein said multi-factor authentication process comprises a password factor and a biometric factor.

13. A batteryless self-boarding pass according to claim 1 further comprising an audit log file of a secure authentication session stored in said memory.

14. A batteryless self-boarding pass according to claim 13 further comprising means for displaying information in said audit log file on said display.

\* \* \* \* \*